(No Model.)

H. L. HOPKINS.
AUTOMATIC BEARING BOX ADJUSTER.

No. 463,627. Patented Nov. 24, 1891.

Witnesses.
W. C. Coolis
J. L. Tunison

Inventor:
Harvey L. Hopkins.
By Coburn & Thacher
Attys.

UNITED STATES PATENT OFFICE.

HARVEY L. HOPKINS, OF CHICAGO, ILLINOIS, ASSIGNOR TO THE HARVEY L. HOPKINS COMPANY, OF SAME PLACE.

AUTOMATIC BEARING-BOX ADJUSTER.

SPECIFICATION forming part of Letters Patent No. 463,627, dated November 24, 1891.

Application filed May 8, 1891. Serial No. 392,114. (No model.)

*To all whom it may concern:*

Be it known that I, HARVEY L. HOPKINS, a citizen of the United States, residing at Chicago, in the county of Cook and State of Illinois, have invented a certain new and useful Improvement in Automatic Bearing-Box Adjusters, which is fully set forth in the following specification, reference being had to the accompanying drawings, in which—

Figure 1:
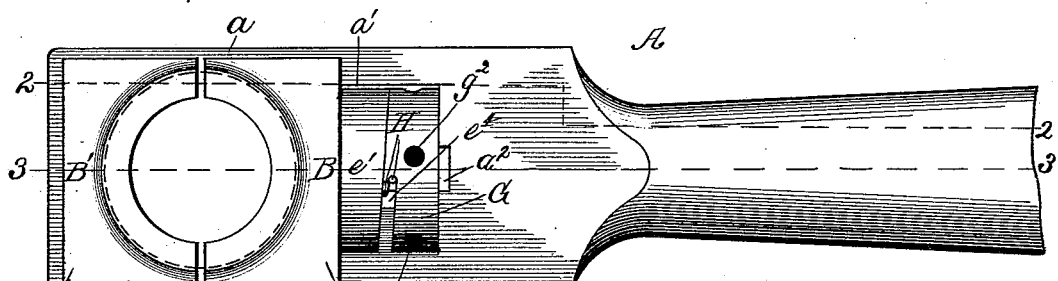
Figure 2:
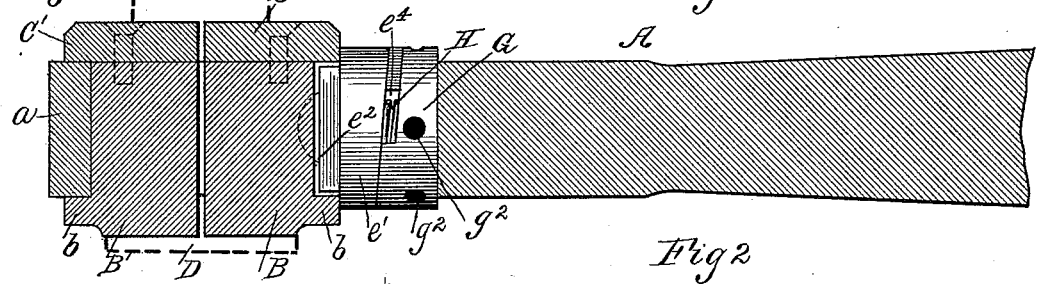
Figure 3:
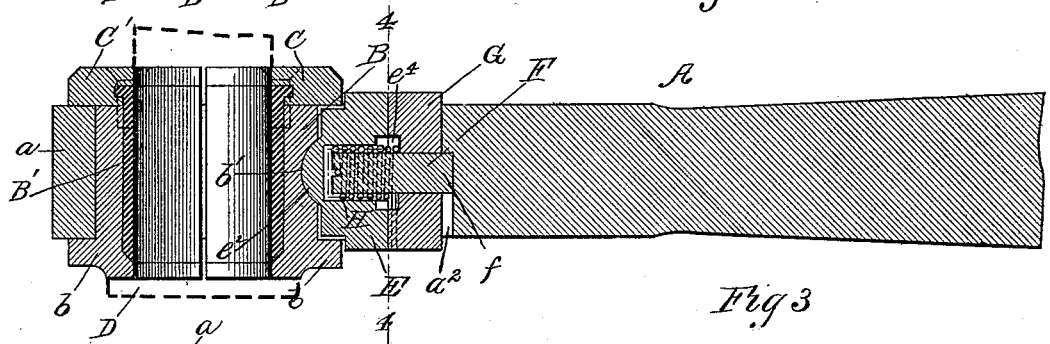
Figure 4:
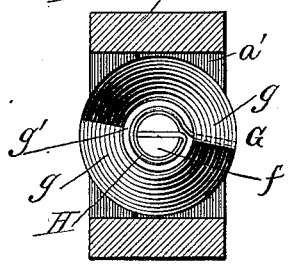
Figure 5:
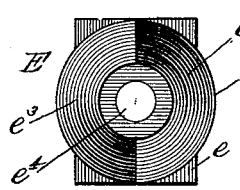
Figure 6:
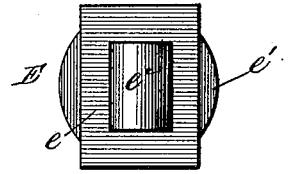
Figure 7:
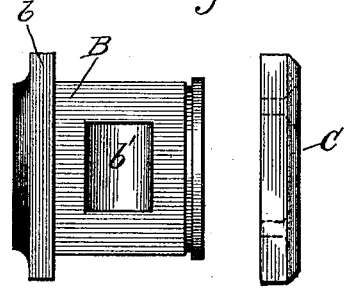

Figure 1 represents a side elevation of the head of a pitman or connecting rod embodying my invention; Fig. 2, a plan section of the same, taken on the broken line 2 2 of Fig. 1; Fig. 3, a similar plan section taken on the line 3 3 of Fig. 1; Fig. 4, a cross-section of the same, taken on the line 4 4 of Fig. 3, the pin F and spring thereon being in elevation; Fig. 5, a front end elevation of the stationary cam-block detached; Fig. 6, a rear end elevation of the same; Fig. 7, an elevation of the inner or rear brass or part bearing detached.

My invention relates to devices for automatically adjusting the boxes or brasses of box-bearings, so that all wear of the same will be taken up automatically and immediately, whereby perfect bearing contact with the journal is always maintained and all "pounding" prevented.

The present invention is a modification or improvement of the invention contained in Letters Patent No. 441,797, granted to me December 2, 1890, and of the more general invention set forth in my prior Letters Patent, No. 421,715, dated February 18, 1890.

I will now describe in detail the construction and operation of devices whereby I have carried out my invention in a practical way, and will then point out more definitely in claims the particular improvements which I believe to be new and wish to secure by Letters Patent.

I have shown the improvement in the drawings and shall describe the same as applied to the connecting-rod of an engine; but this is for the purpose of illustration only, as the improvement is adapted to box-bearings in other locations and on other devices, and I contemplate its application wherever it can be used.

In the accompanying drawings, A represents a connecting-rod, the head $a$ of which is here shown provided with a long slot $a'$; but it may be constructed with a fork instead of the slot. Both forms are common. The part boxes or brasses B and B' are fitted, as usual, within the slot of this head, B representing the inner brass and B' the outer one. At one end these brasses are provided with a projecting flange $b$, adapted to abut against the side of the head, and the brasses are held in place by means of plates C and C', fastened, respectively, to the other ends of the brasses by screws or otherwise after they are slipped into the head, and projecting out beyond the sides thereof so as to abut against the other side of the head, as seen in Figs. 2 and 3. When a forked head is used, of course the brasses may be constructed with the projecting flanges at each end. The wrist or journal D is embraced by these brasses, as usual. The inner brass B is provided upon its outer face with a recess $b'$, which is concave or circular in cross-section laterally across the brass, as seen in Figs. 3 and 7, whereby it is adapted to form a seat for a semi-cylindrical projection.

There is considerable space within the slot of the head between the inner brass B and the bottom or inner face of the slot, and within this space the adjusting devices are mounted, which operate automatically to take up all wear and keep the said brass B constantly in proper contact with the wrist, and these devices I will now describe.

Immediately behind the brass B is a bearing-block E, fitted within the slot in the head and movable back and forth therein, being held within the head by means of flanges or any other suitable device. In the drawings it is shown constructed with its inner face $e$ adapted to enter between the projecting flanges on the brass, while its outer face $e'$ is somewhat larger, as seen in Fig. 3. The width of the smaller section $e$ is a little less than the width of the space between the said flanges, as seen in Fig. 3, so as to provide for a slight lateral movement of this block, and the said inner face is provided with a semi-cylindrical projection $e^2$, which is adapted to be seated in the corresponding recess $b'$ in the brass, thus providing for a slight lateral oscillation of the bearing-block. The outer face $e'$ of this bearing-block is of cylindrical form, making a kind of cylindrical boss on the face of the plate, the diameter of which is slightly greater than the width of the block. Upon the face of this cylindrical face one or more cam-surfaces $e^3$ are provided. In the drawings two of these faces are shown; but a construction with only one continuous cam or with more than two may be employed, as desired. As shown in the drawings, these surfaces are semicircular spirals. The block is also provided with a central circular recess $e^4$ sunk in from the outer face, the outer portion of which is slightly enlarged in diameter, as seen in Fig. 3. A pin F is set at one end in this recess, the pin being somewhat smaller than the recess. A disk G is mounted loosely on the pin outside of the block E, so as to be free to turn on the pin. The inner face of this disk is provided with cam projections or faces $g$, corresponding to those on the block E, and the central opening $g'$ in the disk, which receives the pin, is also preferably enlarged next to the block to correspond with the recess in the latter, as seen in Fig. 3. A spring H is coiled around the pin within the recess in the block E, the inner end of the spring being fastened to the inner end of the pin, as seen in Fig. 3, while the outer end is fastened to the disk G, as seen in Fig. 4. The spring thus arranged and connected and under strain will of course have a tendency to turn the disk G upon the pin if the latter is held stationary, and thus by means of the cams on the rotary disk operating upon the similar surfaces on the stationary block will press the latter outward against the brass B, and if made with sufficient strength will therefore hold the latter up into proper contact with the wrist under all conditions and with any ordinary wear. The pin is held from turning by setting it properly in the bottom of the slot in the head. This may be done in any suitable way; but a very convenient mode is shown in the drawings, in which the outer end $f$ of the pin is square-headed and adapted to enter a shallow groove $a^2$ in the bottom of the head-slot, running straight in from one side to a point a little beyond the center of the head, so that the pin when set into the end of this groove will stand about centrally of the head. When these parts are in position and adjusted, as described, the straight outer face of the disk abuts against the bottom of the head-slot, as seen Fig. 3, and from the same figure it will appear that the action of the spring upon this one movable disk will serve to adjust the bearing-block against the brass, as described above, and with the effect already mentioned, and which is the same in result as in my prior patent, No. 441,797.

Sometimes the relation of the parts will be slightly disarranged, so that the wrist-pin will not stand absolutely at right angles to the connecting-rod or pitman, and then if the contact-faces between the brass B and the bearing-block E are perfectly flat there will be some slight binding, as no lateral movement of either will then be possible. In the construction shown and described, the bearing-block being of a little less width than the space between the flanges and its contact with the brass being by a cylindrical joint, it is obvious that this difficulty will be entirely obviated, for there may be a slight lateral oscillation of the bearing-block on the brass, or vice versa. In actual practice I have found this a very important feature, for it entirely obviates a difficulty which in some cases would result in breaking some of the parts. It will be understood, of course, that the bearing-block must be held slightly away from the brass, normally as seen in Fig. 3; but I do not here claim this improvement, broadly, but only in connection with the special devices here shown and described. The invention, broadly considered, is claimed in another application filed by me of even date herewith.

In the rim of the oscillating disk G a series of holes $g^2$ may be provided, whereby the disk may be turned back by means of a pin whenever it is desired to release or remove the adjusting or bearing devices. It will be noticed that as the oscillating cam-disk G is mounted on the pin F it is in the nature of a ring, while the block E is substantially a solid piece stationary in position, except to and from the bearing-brasses, and provided with cam-surfaces raised upon one of its faces and integral therewith.

In some of the details of construction and arrangement there may be modifications made without departing from my invention—such, for instance, as the particular construction and fastening of the pin and the spring with reference to the other parts.

Having thus described my invention, what I claim as new, and desire to secure by Letters Patent, is—

1. The box-bearing B B', in combination with the bearing-block E, arranged to bear upon the movable part box and provided with a cam projection or projections upon its outer face, a stationary pin F, the disk G, mounted loosely on said pin and provided with a cam-face corresponding to that of the said bearing-block, and the spring H, connected at one end to the pin and at the other to the disk G, mounted loosely thereon, subtantially as described.

2. The box-bearing B B', in combination with the bearing-block E, arranged to bear upon the movable part box and provided with a cam projection or projections upon its outer face, the independent pin F, set in said block and secured in the head of the connecting-rod, the disk G, mounted loosely on said pin and provided with a cam-face corresponding to that of the said bearing-block, and the spring H, connected at one end to the pin and at the other to the disk G, mounted loosely thereon, substantially as described.

3. The forked or slotted head $a$, provided with a lateral groove $a^2$, extending in from one side at the bottom of the slot, in combination with the part-box bearing B B', the bearing-block E, provided with the central recess or socket $e^4$ and cam projections $e^3$, the pin F, mounted at one end in the said socket and at the other in the groove $a^2$, the cam-disk G, mounted loosely on said pin, and the actuating-spring H, substantially as described.

4. The forked or slotted head $a$, in combination with the part-box bearing B B', the former provided with a semi-cylindrical recess $b'$ in its outer face and arranged vertically to the wrist, the bearing-block E, provided with a corresponding semi-cylindrical projection $e$ on its inner face and cam projections $e^3$ on its outer face, the independent pin F, arranged lengthwise of the connecting-rod and mounted in the head of the latter, the cam-disk G, mounted loosely on the pin, and the actuating-spring H, substantially as described.

HARVEY L. HOPKINS.

Witnesses:
CARRIE FEIGEL,
A. M. BEST.